(12) United States Patent
Mangeruca et al.

(10) Patent No.: US 12,367,780 B2
(45) Date of Patent: Jul. 22, 2025

(54) SAFETY MONITOR

(71) Applicant: Rockwell Collins, Inc., Cedar Rapids, IA (US)

(72) Inventors: Leonardo Mangeruca, Rome (IT); Marco Marazza, Rome (IT); Stefano Minopoli, Rome (IT)

(73) Assignee: Rockwell Collins, Inc., Cedar Rapids, IA (US)

( * ) Notice: Subject to any disclaimer, the term of this patent is extended or adjusted under 35 U.S.C. 154(b) by 409 days.

(21) Appl. No.: 17/493,466

(22) Filed: Oct. 4, 2021

(65) Prior Publication Data

US 2022/0108619 A1    Apr. 7, 2022

(30) Foreign Application Priority Data

Oct. 5, 2020 (EP) .................................... 20425041

(51) Int. Cl.
| | |
|---|---|
| G08G 5/55 | (2025.01) |
| G08G 5/30 | (2025.01) |
| G08G 5/59 | (2025.01) |
| G08G 5/80 | (2025.01) |

(52) U.S. Cl.
CPC ................. G08G 5/55 (2025.01); G08G 5/30 (2025.01); G08G 5/59 (2025.01); G08G 5/80 (2025.01)

(58) Field of Classification Search
CPC ......... G08G 5/006; G08G 5/003; G08G 5/045
USPC ...................................................... 701/120
See application file for complete search history.

(56) References Cited

U.S. PATENT DOCUMENTS

| | | | |
|---|---|---|---|
| 6,421,603 B1* | 7/2002 | Pratt | .................. G01C 21/3878 244/175 |
| 7,546,206 B1 | 6/2009 | Miller et al. | |
| 7,720,630 B1 | 5/2010 | Miller et al. | |
| 7,742,847 B2 | 6/2010 | Demers et al. | |
| 7,925,393 B2 | 4/2011 | Bolt et al. | |

(Continued)

FOREIGN PATENT DOCUMENTS

| | | |
|---|---|---|
| CN | 111240193 A | 6/2020 |
| EP | 1218698 A1 | 7/2002 |

(Continued)

OTHER PUBLICATIONS

Communication pursuant to Article 94(3) EPC for European Patent Application No. 20425041.9, dated Nov. 8, 2022, 4 pages.

(Continued)

*Primary Examiner* — Isaac G Smith
(74) *Attorney, Agent, or Firm* — Kinney & Lange, P.A.

(57) ABSTRACT

A safety monitor arranged to: receive a flight plan comprising a plurality of waypoints for an aircraft to follow on a flight mission; receive hazard data corresponding to one or more hazards; generate an aircraft occupancy region comprising a four-dimensional volume corresponding to a range of possible spatial and temporal coordinates for the aircraft along the flight plan; generate a hazard occupancy region comprising a four-dimensional volume corresponding to a range of possible spatial and temporal coordinates associated with the one or more hazards; and determine whether there is an overlap between the four-dimensional volume of the aircraft occupancy region and the hazard occupancy region.

17 Claims, 6 Drawing Sheets

(56) References Cited

U.S. PATENT DOCUMENTS

| | | | |
|---|---|---|---|
| 8,159,369 B1* | 4/2012 | Koenigs | G01S 13/953 |
| | | | 340/963 |
| 8,818,696 B2 | 8/2014 | Klooster et al. | |
| 8,843,303 B1 | 9/2014 | Young et al. | |
| 8,977,482 B2 | 3/2015 | Ballin et al. | |
| 9,177,479 B2 | 11/2015 | Castillo-Effen et al. | |
| 9,196,165 B2 | 11/2015 | La Civita et al. | |
| 9,224,302 B1 | 12/2015 | Young et al. | |
| 9,697,737 B2 | 7/2017 | Hale et al. | |
| 10,269,253 B2 | 4/2019 | Borgyos | |
| 10,339,816 B2 | 7/2019 | Sharma et al. | |
| 10,459,446 B2 | 10/2019 | Nishi | |
| 10,467,911 B2 | 11/2019 | Kneuper et al. | |
| 10,494,108 B1* | 12/2019 | Finley | B64D 43/00 |
| 10,502,584 B1 | 12/2019 | Suiter et al. | |
| 10,573,186 B2 | 2/2020 | Venkataramana et al. | |
| 11,257,382 B2 | 2/2022 | De Prins et al. | |
| 11,270,593 B2 | 3/2022 | Molnar et al. | |
| 2004/0059504 A1* | 3/2004 | Gray | G08G 5/0078 |
| | | | 342/29 |
| 2005/0075763 A1 | 4/2005 | Brigode | |
| 2007/0146167 A1* | 6/2007 | Miller | G08G 5/0078 |
| | | | 340/963 |
| 2007/0179685 A1* | 8/2007 | Milam | G01C 21/24 |
| | | | 701/3 |
| 2010/0271239 A1* | 10/2010 | Kolcarek | G01W 1/10 |
| | | | 340/971 |
| 2012/0158278 A1 | 6/2012 | Peinecke et al. | |
| 2018/0218619 A1* | 8/2018 | Brown | G08G 5/0013 |
| 2019/0311631 A1 | 10/2019 | Holmes | |
| 2019/0325756 A1 | 10/2019 | Cleaver et al. | |
| 2020/0105146 A1* | 4/2020 | Schwartz | G08G 5/0039 |
| 2020/0111375 A1* | 4/2020 | Garden | G08G 5/045 |
| 2020/0175628 A1* | 6/2020 | Srinivasan | G06Q 50/265 |
| 2020/0200540 A1 | 6/2020 | Rossi et al. | |
| 2021/0287558 A1* | 9/2021 | Schulze | G08G 5/0069 |
| 2021/0295716 A1 | 9/2021 | Foltan | |
| 2021/0383706 A1 | 12/2021 | Gibbons et al. | |

FOREIGN PATENT DOCUMENTS

| | | | | |
|---|---|---|---|---|
| FR | 3090850 B1 | | 1/2021 | |
| GB | 2589302 A | | 6/2021 | |
| JP | 2011086312 A | * | 4/2011 | G01C 21/005 |
| WO | 0122034 A2 | | 3/2001 | |
| WO | 0125727 A1 | | 4/2001 | |
| WO | 0122034 A3 | | 10/2001 | |
| WO | 2011009606 A2 | | 1/2011 | |

OTHER PUBLICATIONS

Extended European Search Report for European Patent Application No. 20425041.9, dated Mar. 29, 2021, 7 pages.

"An Online Verification Framework for Motion Planning of Self-driving Vehicles with Safety Guarantees" (Pek et al.); AAET Conference, 2019.

ASTM-F3269-17 "Standard Practice for Methods to Safely Bound Flight Behavior of Unmanned Aircraft Systems Containing Complex Functions" published 2017.

\* cited by examiner

SAFETY MONITOR

TECHNICAL FIELD

This disclosure relates to a safety monitor for autonomous planning functions, for example in aerospace applications, particularly though not exclusively to a safety monitor that verifies the safety of a given flight plan.

BACKGROUND ART

Autonomous systems have the potential of increasing performance and safety across a wide range of application domains, including aerospace applications, such as unmanned aerial vehicles (UAVs) and single pilot operations (SPO). Among the key characteristics that make autonomous systems successful are the ability to find optima in huge solution spaces under multiple constraints and to learn from experience in the form of a given amount of data.

However, these characteristics raise the level of complexity of the algorithms employed to the point that traditional offline verification methods struggle to increase confidence in these systems, hindering the ability to certify them at the appropriate assurance level.

In order to accelerate the introduction of autonomous functions in safety-critical applications, the ASTM-F3269-17 standard proposes a 'Run-Time Assurance' architecture, in which a safety monitor checks the aircraft behaviour against pre-defined safety limits and engages a recovery control function in case of possible violations.

It will be appreciated that, in general, aircraft follow a flight plan which is typically generated in advance. Such a flight plan is normally constructed from a series of waypoints, i.e. spatial coordinates in a suitable coordinate system such as latitude, longitude, and altitude. These waypoints may also have timestamps associated with them, such that the flight plan is a series of four-dimensional (4D) points to be followed by the aircraft, where the four dimensions correspond to latitude, longitude, altitude, and time.

In general, it is critical that flight plans are verified for safety. It will be appreciated that there are a number of factors that may impact the safety of a given flight path, such as hazards that may exist along the flight path. By way of example only, prevailing weather conditions such as storms and high winds may have a significant negative impact on the safety of a particular flight path. It is important that flight paths avoid hazards such as bad weather, other aircraft, terrain, etc.

Approaches to generating safety-verified flight plans, known in the art per se, typically involve taking data relating to the planned origin and destination of the desired journey (and potentially specifying certain waypoints along the journey), as well as data relating to any potential hazards, for example using weather forecast data. All of this data is typically fed into a flight planning algorithm that generates the flight plan that accounts for the hazard information. This results in a flight plan that is safe by design, by virtue of it having been generated with the hazard information in mind at the time. Such a conventional flight planner, which may make use of standard algorithms, may be certified by an appropriate authority as complying with safety regulations, and thus the verified flight plans it generates are therefore certified as being safe.

A significant limitation of conventional approaches is that it requires that the algorithm used for generating the flight plan is certified. It has been appreciated that it would be advantageous to allow the use of non-standard algorithms including but not limited to artificial intelligence (AI), machine learning (ML), and genetic algorithms. These non-standard algorithms are more difficult to certify due to their nature of learning and evolving over time. However, such algorithms may have benefits in, among other applications, autonomous planning functions, e.g. for UAVs.

SUMMARY OF THE DISCLOSURE

In accordance with a first aspect, the present disclosure provides a safety monitor arranged to:
  receive a flight plan comprising a plurality of waypoints for an aircraft to follow on a flight mission;
  receive hazard data corresponding to one or more hazards;
  generate an aircraft occupancy region comprising a four-dimensional volume corresponding to a range of possible spatial and temporal coordinates for the aircraft along the flight plan;
  generate a hazard occupancy region comprising a four-dimensional volume corresponding to a range of possible spatial and temporal coordinates associated with the one or more hazards; and
  determine whether there is an overlap between the four-dimensional volume of the aircraft occupancy region and the hazard occupancy region.

This first aspect of the present disclosure extends to a method of verifying a flight plan comprising a plurality of waypoints for an aircraft to follow on a flight mission, the method comprising:
  receiving the flight plan;
  receiving hazard data corresponding to one or more hazards;
  generating an aircraft occupancy region comprising a four-dimensional volume corresponding to a range of possible spatial and temporal coordinates for the aircraft along the flight plan;
  generating a hazard occupancy region comprising a four-dimensional volume corresponding to a range of possible spatial and temporal coordinates associated with the one or more hazards; and
  determining whether there is an overlap between the four-dimensional volume of the aircraft occupancy region and the hazard occupancy region.

This first aspect of the present disclosure extends to a non-transitory computer-readable medium comprising instructions that, when executed by a processor, cause the processor to carry out a method of verifying a flight plan comprising a plurality of waypoints for an aircraft to follow on a flight mission, the method comprising:
  receiving the flight plan;
  receiving hazard data corresponding to one or more hazards;
  generating an aircraft occupancy region comprising a four-dimensional volume corresponding to a range of possible spatial and temporal coordinates for the aircraft along the flight plan;
  generating a hazard occupancy region comprising a four-dimensional volume corresponding to a range of possible spatial and temporal coordinates associated with the one or more hazards; and
  determining whether there is an overlap between the four-dimensional volume of the aircraft occupancy region and the hazard occupancy region.

Thus it will be appreciated that, in accordance with examples of the present disclosure, a flight plan may be verified in a separate process to the generation of that flight plan. This may advantageously allow the use of non-standard algorithms such as AI, ML, and/or genetic algorithms to generate the flight plan externally of the safety monitor, where the flight plan is then separately verified by the safety monitor disclosed herein. The safety monitor itself may then be certified as meeting relevant safety requirements, and thus flight plans verified by the safety monitor can be certified, even when they are not generated using a conventional standard algorithm.

The first aspect of the disclosure also extends to an aircraft comprising the safety monitor outlined hereinabove. It will be appreciated that the term 'aircraft' as used herein extends to any vehicle that can fly, including but not limited to airplanes, helicopters, UAVs, drones, airships, blimps, and powered gliders.

As the aircraft occupancy region (AOR) and hazard occupancy region (HOR) are four-dimensional (4D) volumes, they account for both the spatial and temporal positions of the aircraft and hazard(s), and thus safety monitor takes both into account. For example, a flight plan in which the aircraft will pass through airspace that is presently occupied by the hazard, but won't be by the time that the aircraft reaches, may be permitted. In general, it should be appreciated that both the spatial and temporal positions (or at least the positions having a sufficiently high probability of being occupied by the aircraft and hazard) of the aircraft and the relevant hazard must coincide for a hazard to exist.

The 4D volumes of the aircraft and hazard occupancy regions can advantageously account for uncertainties associated with the aircraft and/or the hazard(s), as outlined below.

Firstly, the safety monitor may accommodate uncertainties in measured inputs (UMI). It has been appreciated that measured parameters relating to the aircraft and its travel may have a degree of uncertainty associated with them. For example, sensors that are used to determine the location of the aircraft, e.g. position sensors and/or velocity sensors, may have an associated uncertainty in the accuracy of their measurements. The four-dimensional volume of the aircraft occupancy region may therefore be 'enlarged' to accommodate these uncertainties. Thus rather than exactly following the predicted trajectory of the flight plan, the four-dimensional volume of the aircraft occupancy region extends in the appropriate dimensions to reflect these uncertainties, i.e. the region reflects the range of possible positions that the aircraft could be in along the flight path owing to these uncertainties in the measured data.

Additionally or alternatively, another type of UMI may arise due to uncertainties in measured parameters relating to the hazard(s). For example, hazard data determined by a sensor on-board the aircraft (e.g. an on-board weather sensor) or from an external source (such as another aircraft or from the ground) that is provided to the safety monitor may have an associated uncertainty, and the four-dimensional volume of the hazard occupancy region may be enlarged to accommodate this uncertainty. If an area of hazardous weather is detected by on-board sensors but the size of the area or the trajectory of the weather is uncertain, the hazard occupancy region may be generated so as to extend so as to cover the possible range of the hazardous area.

Thus in some examples, the safety monitor is arranged to: determine an uncertainty in a measured input corresponding to the aircraft; and enlarge the aircraft occupancy region to reflect said uncertainty in a measured input corresponding to the aircraft.

In some potentially overlapping examples, the safety monitor is arranged to: determine an uncertainty in a measured input corresponding to the one or more hazards; and enlarge the hazard occupancy region to reflect said uncertainty in a measured input corresponding to the one or more hazards.

Secondly, the safety monitor may accommodate uncertainties due to pilot decisions and approximations (UPDA). These UPDA may relate to deviations in the trajectory of the aircraft from the intended flight path in terms of position, speed, and/or time. The aircraft occupancy region may be enlarged to accommodate these uncertainties, i.e. the four-dimensional volume extends to as to cover the possible regions in four-dimensional space and time that the aircraft may occupy as a result of such deviations.

Thus in some examples, the safety monitor is arranged to: determine an uncertainty due to pilot decisions and/or flight data; and enlarge the aircraft occupancy region to reflect said uncertainty due to pilot decisions and/or flight data.

Thirdly, the safety monitor can also accommodate uncertainties in predicted inputs (UPI). For example, a weather forecast (i.e. data relating to a prediction of a hazard, rather than an explicitly measured or detected hazard) provided to the safety monitor may have an associated uncertainty, and the four-dimensional volume of the hazard occupancy region may be enlarged to accommodate the uncertainty in the prediction.

Thus in some examples, the safety monitor is arranged to: determine an uncertainty in a predicted input corresponding to the one or more hazards; and enlarge the hazard occupancy region to reflect said uncertainty in a predicted input corresponding to the one or more hazards.

When determining whether there is an overlap, an intersection operation may be carried out to determine whether the aircraft and hazard occupancy regions overlap at any point. If this occurs, it is determined that the flight plan is not safe.

While this overlap determination may be carried out in respect of a strict overlap between the aircraft and hazard occupancy regions such that the flight plan must 'cross' into the hazardous area to be deemed unsafe, in practice this determination may comprise checking whether a minimum separation distance (MSD) between the aircraft occupancy region and the hazard occupancy region is greater than a safety separation distance (SSD), where the flight plan is determined to be safe only if this is true. In other words, if the flight plan would bring the aircraft occupancy region too close to the hazard occupancy region (i.e. if the MSD is less than the SSD at any point along the flight path), the flight plan is deemed unsafe.

The determination as to whether the MSD is less than the SSD at any point along the flight path could be made by checking the separation distance between the two 4D regions at all points. However, in some examples the hazard occupancy region is expanded by the safety separation distance. In other words, a buffer equal in size to the SSD may surround the region that is determined to be hazardous, accounting for any uncertainties as outlined above. Thus if an overlap is determined to exist between the aircraft occupancy region and the hazard occupancy region expanded by the SSD, this implies that at some point the MSD is less than the SSD, and so the flight plan may be determined to be unsafe, without needing to explicitly calculate distances between the occupancy regions.

Alternatively, in some examples the aircraft occupancy region could be expanded by the safety separation distance. In such an arrangement, the buffer is provided around the region that may contain the aircraft, where an overlap between the HOR and the AOR expanded by the SSD corresponds to an infringement of the SSD.

As outlined above, the occupancy regions are constructed as 4D volumes so as to describe the potential spatial and temporal occupancy of the aircraft and hazard(s). The 4D volumes or regions can be generated using known geometrical representations, for example using predetermined geometric libraries or using ad hoc implementations.

In some examples, the aircraft occupancy region may comprise a union of hyper-cubes, voxels, polygons, radial regions, ellipsoids, and/or other geometric constructs. In a particular set of examples, the aircraft occupancy region comprises a union of convex polyhedra.

In a set of potentially overlapping examples, the hazard occupancy region may comprise a union of hyper-cubes, voxels, polygons, radial regions, ellipsoids, and/or other geometric constructs. In a particular set of examples, the hazard occupancy region comprises a union of convex polyhedra.

Thus in a set of examples, the aircraft occupancy region and/or the hazard occupancy region comprises a union of convex polyhedra.

Thus, in some examples, the aircraft occupancy region and/or the hazard occupancy region comprises a union of a plurality of geometric constructs selected from a group comprising: hyper-cubes; voxels; polygons; radial regions; ellipsoids; and polyhedra, optionally wherein the aircraft occupancy region comprises a union of a plurality of convex polyhedra.

Similarly, the computations associated with determining whether there is an overlap between the aircraft and hazard occupancy regions can be carried out using predetermined libraries or using an ad hoc implementation. For example, existing libraries—known in the art per se—for building complex shapes can be used as outlined above, and such libraries may comprise precompiled functions for determining overlap (e.g. with an existing intersection function).

While any overlap between the AOR and the HOR may result in invalidation of the flight plan, in at least some examples the hazard occupancy region may comprise a plurality of severity level regions each having a respective severity level associated therewith. The safety monitor may, in some examples, determine an overlap quantity corresponding to an overlap between the aircraft occupancy region and each of the severity level regions. In some such examples, the safety monitor may compare the overlap quantity for each severity region to a respective threshold.

Thus, in some examples, the region closest to the hazard in space and time (i.e. the spatial and temporal positions at which the confidence in the existence of the hazard is highest) may be attributed a high severity level, while one or more surrounding layers of regions may be ascribed decreasingly lower severity levels. By comparing the overlaps for each of these severity level regions to respective thresholds, the safety monitor may allow smaller amounts of overlap for more severe regions and larger amounts of overlap for less severe regions, or potentially no overlap whatsoever for the most critically severe region(s).

The number of severity levels (if present) and the corresponding tolerances for overlap with any given severity level may be set in accordance with the approach to risk that should be taken for the flight plans of a particular aircraft, operator, and/or airspace.

It will be appreciated that any and all of the optional features described herein with respect to examples of the present disclosure may be combined in any suitable combination as appropriate.

BRIEF DESCRIPTION OF THE DRAWINGS

Certain examples of the present disclosure will now be described with reference to the accompanying drawings, in which.

DETAILED DESCRIPTION

Figure 1:
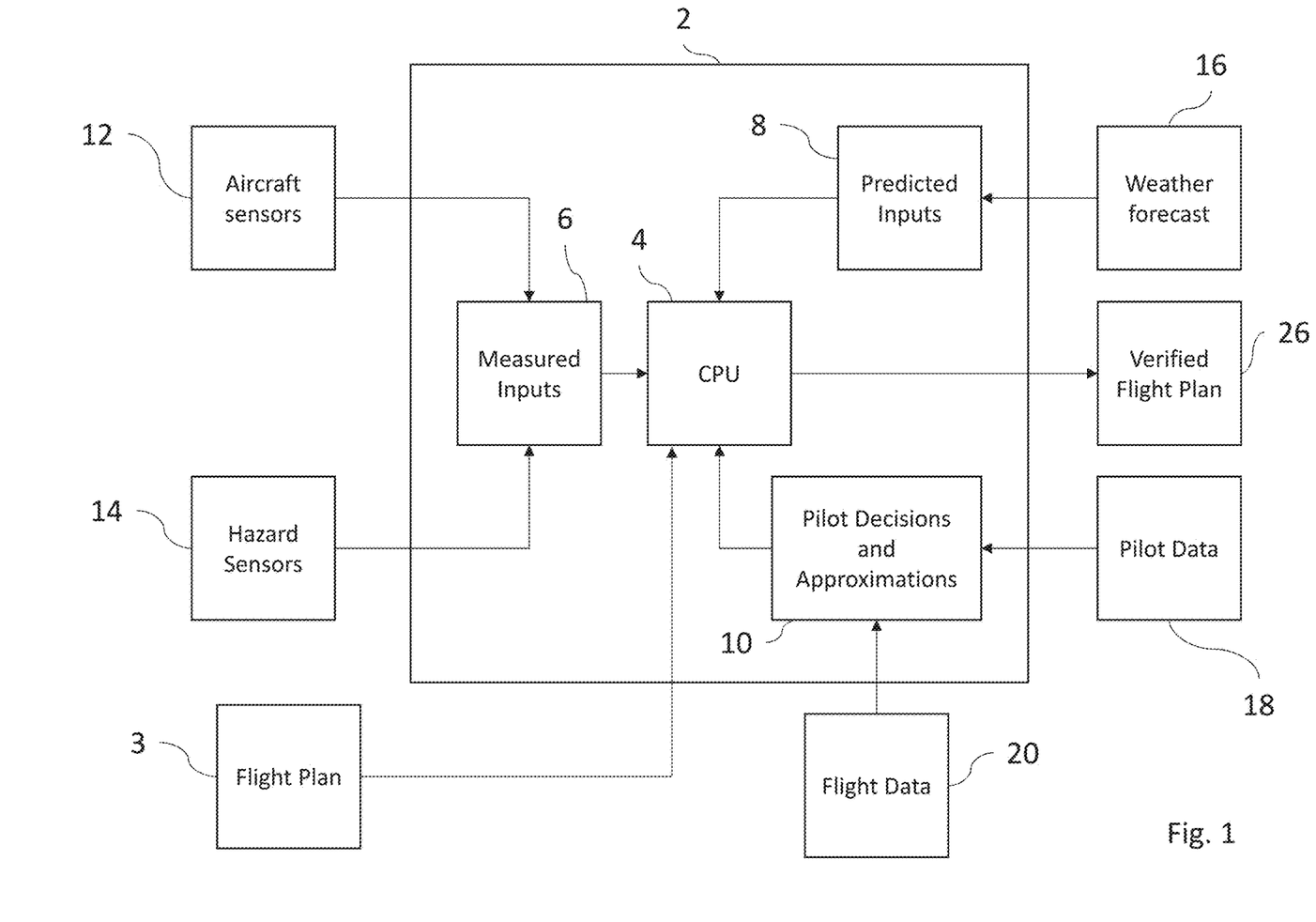
FIG. 1 is a block diagram of a safety monitor in accordance with an example of the present disclosure.

FIG. 1 is a block diagram of a safety monitor 2 in accordance with an example of the present disclosure. The safety monitor 2 comprises: a computer processing unit (CPU) 4 (i.e. a processor); a measured inputs interface 6; a predicted inputs interface 8; and a pilot decisions and approximations interface 10. The safety monitor 2 receives a flight plan 3 generated externally (e.g. by a dedicated flight planner) and is arranged to verify the safety of the flight plan 3.

It will be appreciated that the description and the safety monitor 2 shown in FIG. 1 is simplified for ease of reference. A practical 'real-life' system may include other components not shown, and the topology may vary. For example, the various 'interfaces' 6, 8, 10 may not be dedicated hardware or software functional blocks as depicted in FIG. 1 and may instead be contained within one or more functions carried out by the CPU 4 or some other hardware as appropriate. However, the general principles of the safety monitor 2 are described conceptually here for context.

The terms 'processor' and 'CPU' are used generally herein to mean a component that processes data in order to make the necessary determinations described below and it should be noted that any suitable processing means may be used, including but not limited to graphical processing units (GPUs), application specific integrated circuits (ASICs), field-programmable gate arrays (FPGAs), or any other such suitable means. Similarly, the functions may be carried out within a single means, or distributed across multiple such means, as appropriate, without deviating from the scope of the present disclosure.

The measured inputs interface 6 receives data relating to the aircraft from various aircraft sensors 12. These sensors 12 may include: position sensors (e.g. global navigation satellite systems sensors such as global positioning systems or 'GPS' sensors), speed sensors, proximity sensors, and/or inertial measurement sensors such as accelerometers and/or gyroscopes.

The measured inputs interface 6 also receives data relating to hazards from various hazard sensors 14 which supply information to the safety module 2 relating to the condition of the aircraft and/or the local environment, e.g. the airspace around the aircraft. These hazard sensors 14 may include on-board weather sensors (e.g. an on-board weather radar) which determine prevailing weather conditions near the aircraft. Other hazard sensors 14 that may be provided, depending on the application, include: temperature sensors, humidity sensors, pressure sensors, and/or wind speed sensors.

Each of these sensors 12, 14 has an associated accuracy which means that measurements from these sensors 12, 14 have a degree of uncertainty associated with them. These uncertainties are referred to as 'uncertainties in measured inputs' (UMI). As will be outlined in further detail below, the safety monitor 2 incorporates these uncertainties when generating the 4D volumes of the aircraft and hazard occupancy regions.

It will of course be appreciated that other types of sensors not explicitly listed may also be used where their output, and any related uncertainties in their output, may be useful for generating the 4D volumes of the occupancy regions when assessing the safety of some or all flight plans as appropriate.

The predicted inputs interface 8 receives information relating to predicted hazards, which in this example is given via a weather forecast 16. This weather forecast 16 will, in practice, have a certain degree of confidence in it and thus it has an associated uncertainty. This uncertainty (together with any other uncertainties relating to predicted data) are referred to as 'uncertainties in predicted inputs' (UPI).

The pilot decisions and approximations interface 10 receives pilot data 18, corresponding to the actions of the pilot of the aircraft (where appropriate); and flight data 20, corresponding to the deviations from the flight plan 3. As the pilot may control the aircraft or make decisions such that the aircraft does not follow the flight plan 3 perfectly, and/or due to any deviations from the flight plan 3 due to other issues (e.g. due to actuator error or the effects of wind altering the path of the aircraft), there may be uncertainties due to pilot decisions and approximations (UPDA).

When verifying the safety of the flight plan 3, the safety monitor 2 makes use of the UMI, UPI, and UPDA to determine the regions in four-dimensional space that the aircraft and any potential hazards may take during the course of the flight plan's 3 execution. The generation and assessment of these regions is described in more detail below with reference to FIG. 2.

Figure 2:
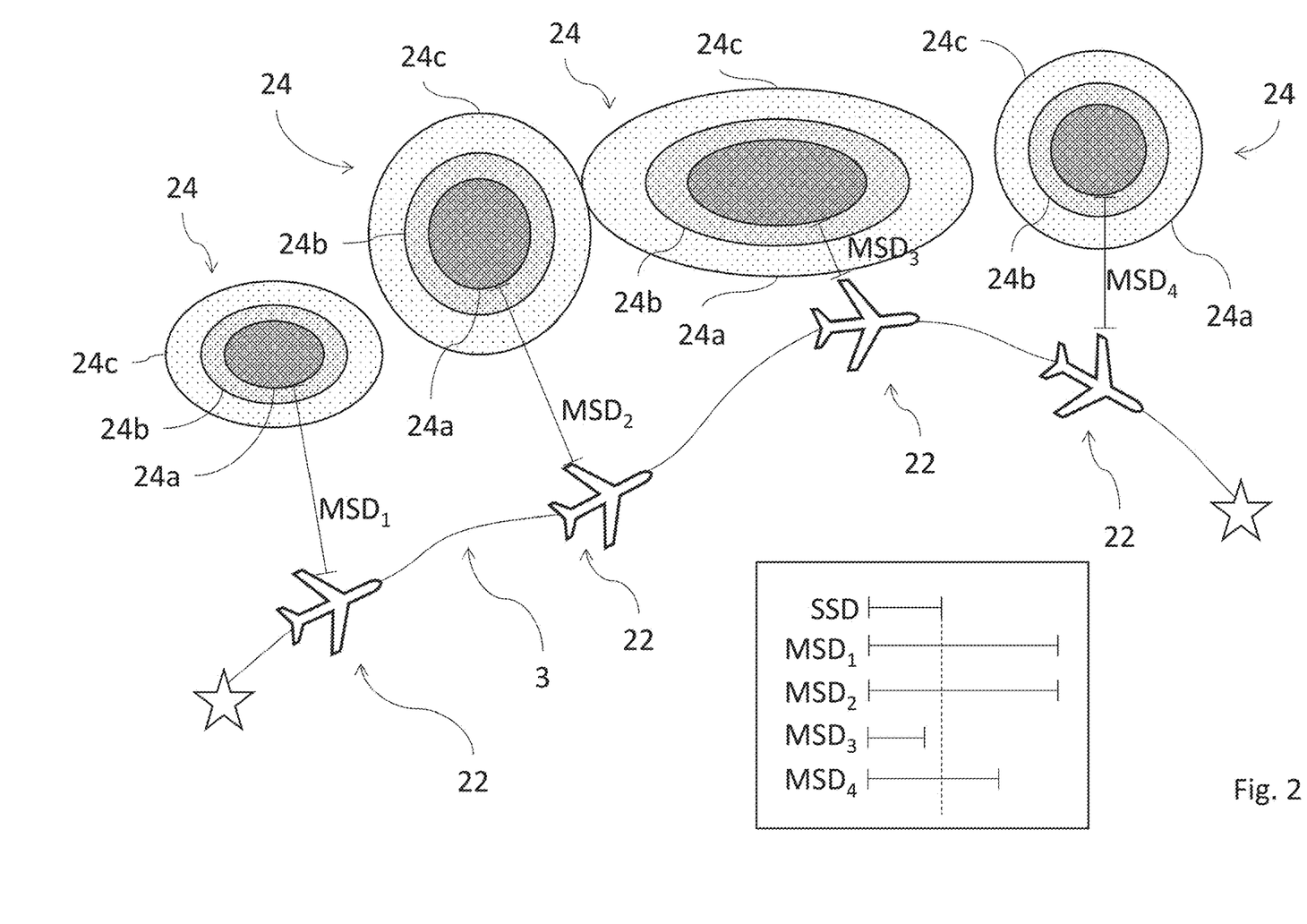
FIG. 2 is a schematic diagram illustrating a flight plan.

FIG. 2 is a schematic diagram illustrating a proposed flight plan 3 to be assessed using the safety monitor 2 outlined above. In particular, FIG. 2 shows the progress of an aircraft 22 along the proposed flight path 3, and the locations of a number of hazardous regions 24 proximate to the flight path 3. As can be seen in FIG. 2, each hazard region 24 contains areas of different severity levels, where the innermost region 24a is the most severe region in which the source of the hazard is located, the surrounding region 24b is of moderate severity, and the outermost region 24c is of lesser severity.

In order for the flight path 3 to be determined as safe, the minimum separation distance (MSD) between the hazard and the aircraft 22 must exceed a safety separation distance (SSD) at all times. In this particular example, the MSD is defined as the distance between the aircraft 22 and the closest point of the innermost, i.e. most severe, region 24a of each hazard 24. In this particular example, there are four hazardous regions 24, each having a respective minimum separation distance $MSD_{1-4}$ to the aircraft 22 when the aircraft 22 passes that hazardous region 24 when following the flight plan 3. While three of the hazardous regions 24 are sufficiently far from the aircraft 22 at all times (as can be seen in FIG. 2: $MSD_1$, $MSD_2$, and $MSD_4$ are all greater than SSD), the third hazardous region 24 is too close to the aircraft 22 for the flight path 3 to be deemed safe (i.e. $MSD_3$ is less than SSD).

It will of course be appreciated that the MSD could instead be defined with respect to a different boundary or point associated with the hazard, where the SSD may also be adjusted accordingly, as appropriate.

The safety monitor 2 in accordance with the present disclosure may advantageously monitor the above safety condition (i.e. that MSD>SSD) in spite of the different uncertainties: UMI, UPI, and UPDA.

Figure 3:
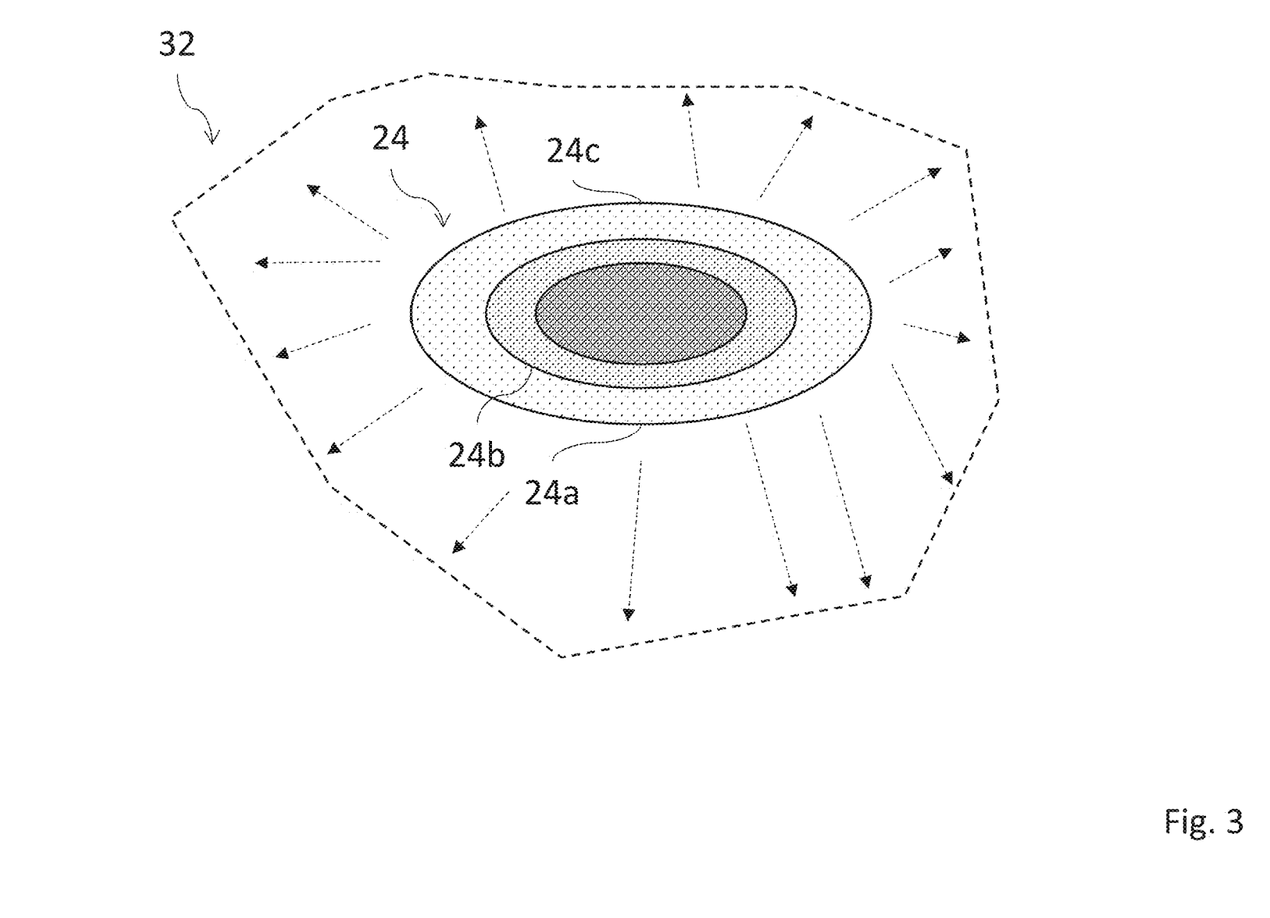
FIG. 3 is a schematic diagram of a hazard occupancy region determined by the safety monitor of FIG. 1.

The safety monitor 2 generates a 'hazard occupancy region' (HOR) corresponding to the hazards 24, as shown in the schematic diagram of FIG. 3. When constructed the HOR, the hazards 24 are represented by 4D volumes that are constructed from a union of hyper-cubes, voxels, polygons, radial regions, ellipsoids, or other suitable geometric shapes. The 4D volumes include the three spatial dimensions and one temporal dimension to capture the evolution of the hazards 24 over time. The safety monitor 2 then enlarges the HOR to account for the UPI and the SSD.

While FIG. 3 shows a two-dimensional (2D) representation, the HOR region is defined in respect of all four dimensions, i.e. the three spatial and one temporal dimensions, such that the HOR extends sufficiently to cover the possible positions in space and time that the hazards 24 may occupy owing to the expected position and extent, subject to the UPI—plus a further margin due to the additional SSD being added.

Figure 4:
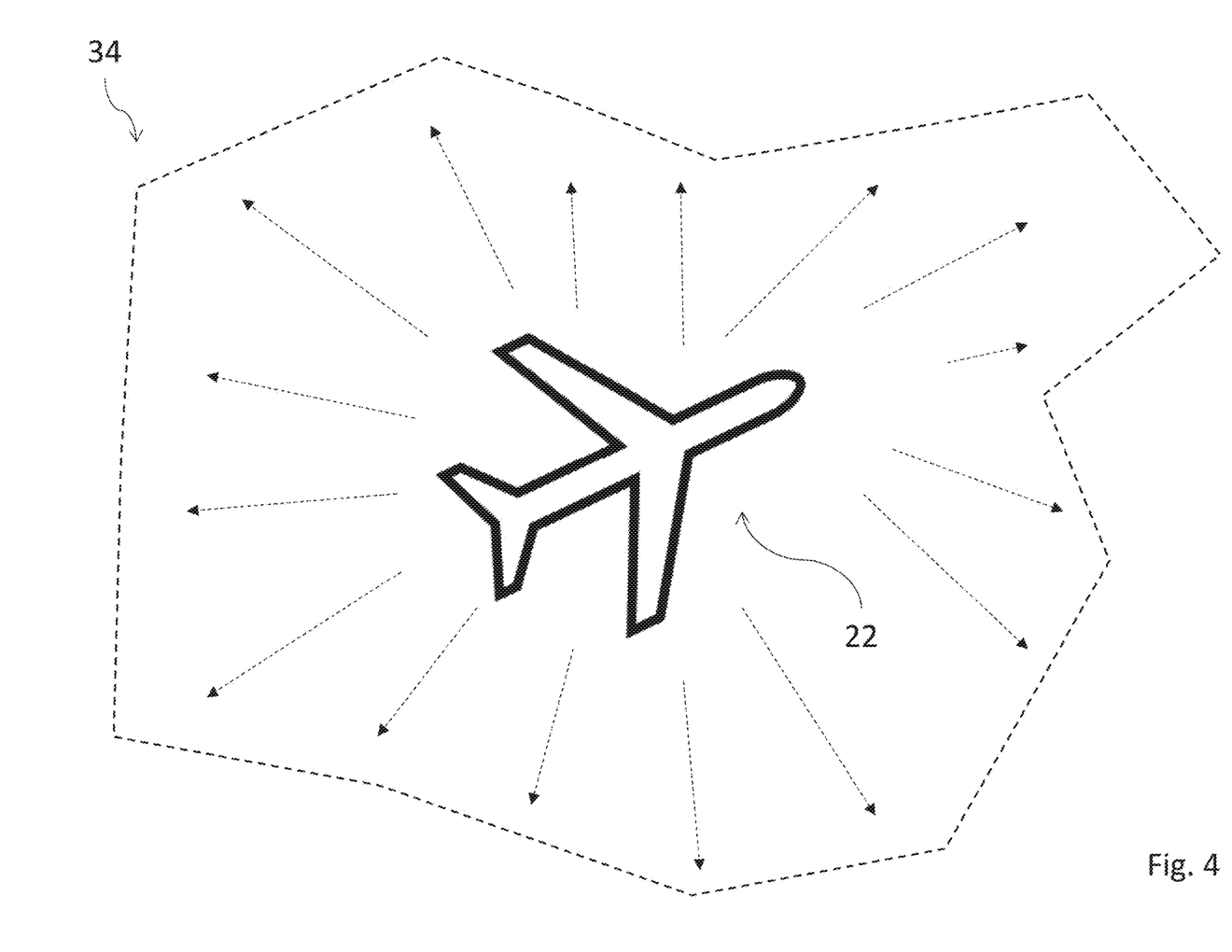
FIG. 4 is a schematic diagram of an aircraft occupancy region determined by the safety monitor of FIG. 1.

Similarly, the safety monitor 2 generates an aircraft occupancy region (AOR) which is also represented by a 4D volume. As with the HOR, the AOR may be constructed from a union of hyper-cubes, voxels, polygons, radial regions, ellipsoids, and/or other geometrical shapes, as appropriate. The AOR covers the predicted position of the aircraft 22 over time, and is enlarged by the UMI and UPDA. Thus the position of the aircraft 22 is estimated assuming the aircraft 22 follows the flight plan 3 with a known accuracy.

The safety monitor 3 checks whether the HOR 32 and AOR 34 overlap or not, by checking whether the two corresponding 4D regions intersect, to generate a verification decision 26. This verification decision 26 is either a decision that the flight plan 3 is verified safe, or a rejection of the flight plan 3 for not meeting the safety requirements.

Specifically, the flight plan 3 is deemed safe if the HOR 32 and the AOR 34 do not intersect at any point. By construction, this ensures that the MSD>SSD condition is met, as the HOR has been expanded by the SSD (as well as by the UPI) as outlined above. If any overlap of the HOR and AOR exists, the flight plan 3 is deemed unsafe because the MSD is therefore necessarily less than the SSD, and thus the flight plan 3 is rejected as soon as any SSD violation occurs.

As outlined above, the 4D regions of the HOR 32 and AOR 34 may be represented using known geometrical representations, available through off-the-shelf computation libraries or developed as ad hoc implementations. The computations required to determine whether the HOR and AOR overlap may be carried out through geometrical operators offered by such libraries or ad hoc implementations as appropriate.

Figure 5:
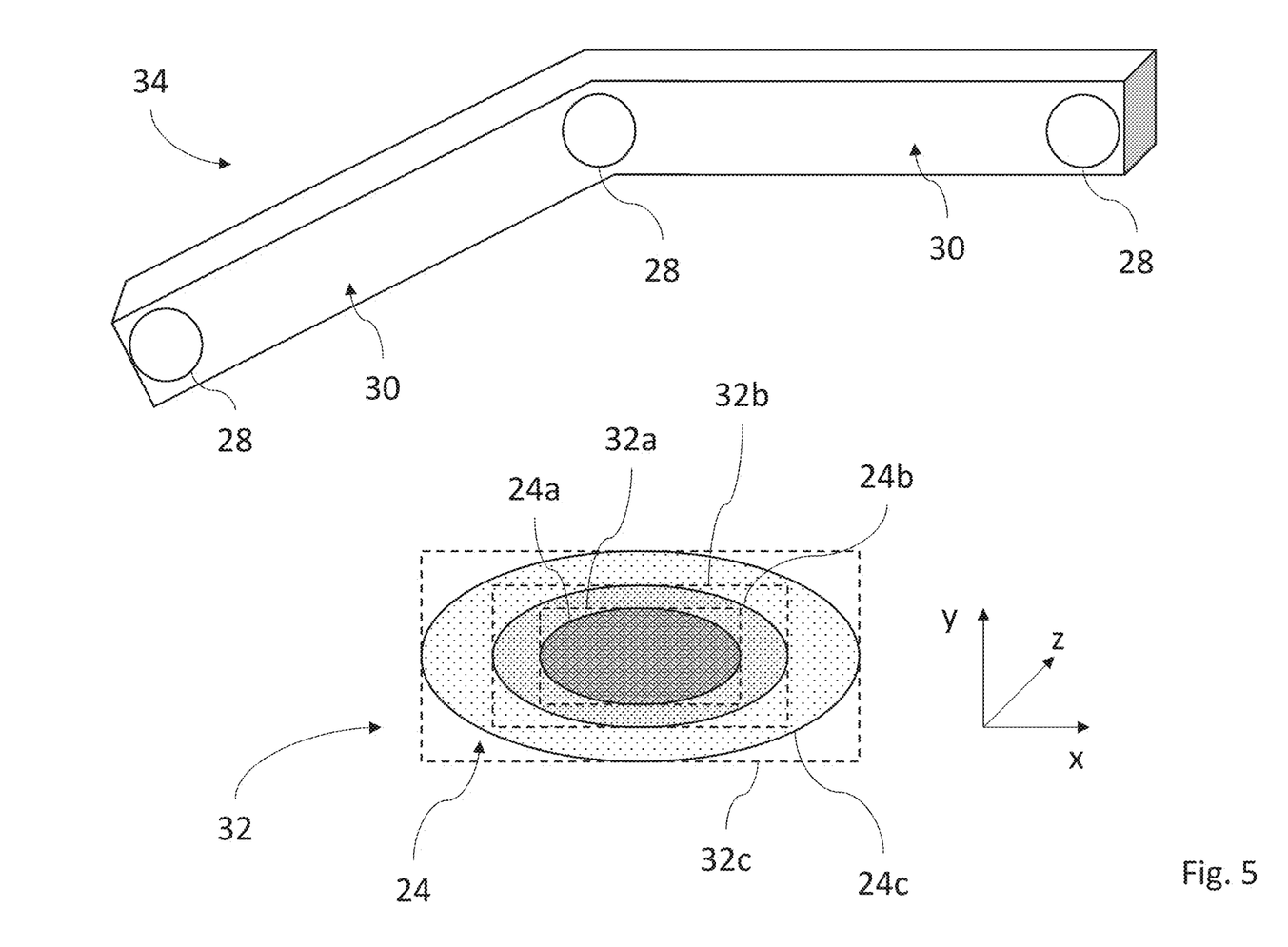
FIG. 5 is a schematic diagram further illustrating the aircraft and hazard occupancy regions.
Figure 6:
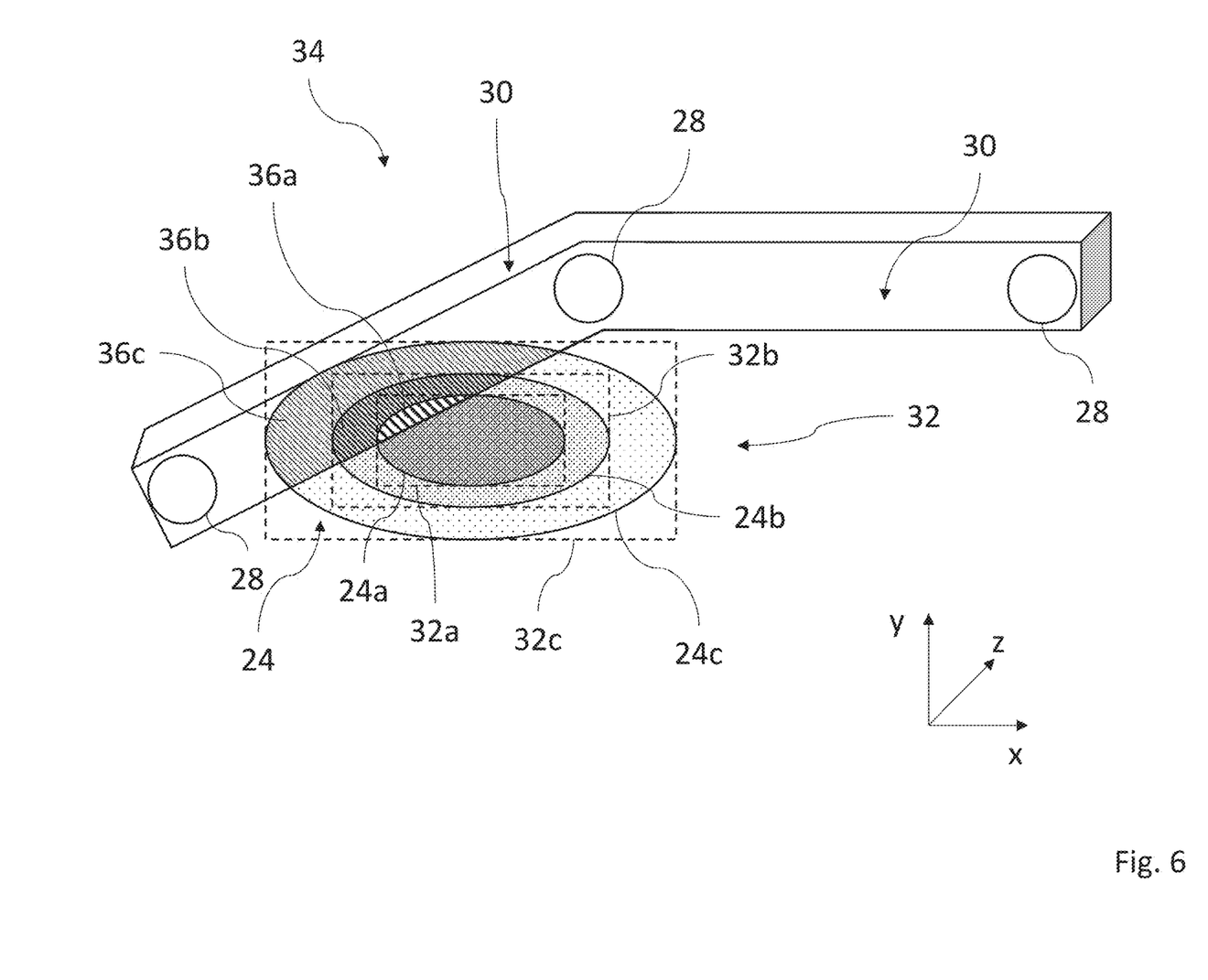
FIG. 6 is a further schematic diagram illustrating an intersection between the occupancy regions.

An example of such an approach is the usage of polygonal or polyhedral representations, e.g. such that the 4D regions of the HOR 32 and AOR 34 are constructed from unions of convex polyhedra, as shown in FIGS. 5 and 6 which are schematic diagrams illustrating the aircraft and hazard occupancy regions determined by the safety monitor 2 of FIG. 1. In particular, FIG. 5 shows the HOR 32 and AOR 34 separately, while FIG. 6 shows a scenario in which there is an overlap between the HOR 32 and AOR 34. In general, geometrical operations over convex polyhedral regions may be particularly computationally efficient.

In this particular example, the AOR 34 is divided in segments 30 between way points 28 and the position of the aircraft 22 in space and time for each segment is represented by a convex polyhedron in 4D as follows: $p_0^{min} \leq p_0 \leq p_0^{max}$, $p_{min} \leq p \leq p_{max}$ and $v_{min}*t+p_0 \leq p \leq v_{max}*t+p_0$, where: p is the position vector; $p_0$ is the initial position vector; v is the velocity vector; and t is time, and where 'min' and 'max' denote minimal and maximal bounds respectively.

Similarly, in some examples, the HOR 32 is represented as a union of convex polyhedra that collectively cover all hazard regions. It will be appreciated that the polyhedra for the HOR 32 may be (but aren't necessarily) more complex than those for the AOR 34 on account of the hazards being a more extensive and potentially more complex in space and time.

The intersection between the AOR 34 and the HOR 32 is computed using polyhedral operations and thus a determination can be made as to whether the MSD is greater than SSD, accounting for the various types of uncertainty as outlined above. It will be appreciated that geometric libraries known in the art per se may generally have such an 'intersection' function, as well as other suitable geometric operators (e.g. the union operator). For example, a library may have a function that takes two lists of convex polyhedra (corresponding to the AOR 34 and HOR 32) as inputs, where the presence or absence of an overlap is determined by cycling over the elements of the AOR 34 and HOR 32 to intersect them so that each of the convex polyhedra of the AOR 34 is intersected with each of the convex polyhedra of the HOR 32.

Additionally, the time and duration of the intersection may be determined, i.e. the starting time and the duration for which the AOR 34 and HOR 32 would potentially intersect if the aircraft 22 were to fly the flight path 3. In some examples, the flight plan 3 may be allowed to continue if the duration of the intersection is sufficiently low that the risk is determined to be below some maximum tolerable risk level.

If different severity levels L are associated with the different convex polyhedra as shown in FIGS. 2 and 3, a hazard occupancy region HOR(L) 32 may defined using a collection of polyhedra 32*a-c* associated with severity level L. This is illustrated in FIGS. 5 and 6 by the dashed boxes surrounding the different hazard severity regions 24*a-c*. In this particular example, there are three severity levels 1-3, where HOR(1) is the most severely hazardous region, HOR (3) is the least hazardous region, and HOR(2) is the moderate severity region.

The intersection between AOR 34 and HOR(L) 32 may then be computed for each severity level L separately, or the computation is done once but the minimum distance and the minimum time of the intersection is provided for each severity level L separately. In this particular example, the AOR 34 intersects with all three severity levels of HOR(L) 32, as shown by the three intersection regions 36*a-c* in FIG. 6, where: the innermost intersection region 36*a* corresponds to the spatial and temporal positions in which the 4D regions of the AOR 34 and most severe hazard level HOR(1) of the HOR 32 overlap; the middle intersection region 36*b* corresponds to the spatial and temporal positions in which the 4D regions of the AOR 34 and moderate severity hazard level HOR(2) of the HOR 32 overlap; and the outermost intersection region 36*c* corresponds to the spatial and temporal positions in which the 4D regions of the AOR 34 and least severe hazard level HOR(3) of the HOR 32 overlap.

While any overlap between the AOR 34 and HOR 32 may result in invalidation of the flight plan 3, the safety monitor 2 may instead provide different allowances of overlap between the AOR 34 and HOR 32 depending on severity level. For example, the safety monitor may allow a small amount of overlap in space and/or time between the AOR 34 and moderate severity hazard level HOR(2), and a certain amount more overlap between the AOR 34 and the lowest severity hazard level HOR (3), while not allowing any overlap with the highest severity level HOR(1)—though examples are envisaged in which a very small amount of overlap with HOR(1) may be allowable.

The number of severity levels (if present) and the corresponding tolerances for overlap with any given severity level may be set in accordance with the approach to risk that should be taken for the flight plans of a particular aircraft, operator, and/or airspace.

Thus, it will be appreciated by those skilled in the art that examples of the present disclosure provide an improved safety monitor that may incorporate a 'plan and verify ahead' function that produces one or more verified flight plans (which may include alternative or 'contingency' plans), which avoid violating safety bounds and ensure safety also in presence of dynamically evolving hazards, unknown detectable hazards and widely variable hazard response delays.

While specific examples of the disclosure have been described in detail, it will be appreciated by those skilled in the art that the examples described in detail are not limiting on the scope of the disclosure.

The invention claimed is:

1. A safety monitor for an aircraft with a pilot, the safety monitor comprising:
 a processor configured to:
  receive from a flight planner a main flight plan comprising a plurality of main waypoints for the aircraft to follow from a planned origin to a planned destination on a flight mission, wherein each main waypoint has four dimensions corresponding to latitude, longitude, altitude, and time;
  receive from the flight planner a contingency flight plan comprising a plurality of contingent waypoints for the aircraft to follow from the planned origin to the planned destination on the flight mission, wherein each contingent waypoint has four dimensions corresponding to latitude, longitude, altitude, and time; and
  continually monitoring the main flight plan while in flight, wherein monitoring the main flight plan comprises:
   generating, while in flight, an aircraft occupancy region comprising a first union of a first plurality of four-dimensional polyhedra, wherein the first union contains all of the plurality of selected waypoints of the selected flight plan;
   receiving from a sensor, a weather forecast, or a different external source, hazard data corresponding to one or more hazards, wherein the hazard data includes a plurality of hazard data points, and each hazard data point has four dimensions corresponding to latitude, longitude, altitude, and time;
   generating, while in flight, a hazard occupancy region comprising a second union of a second plurality of four-dimensional polyhedra, wherein the second union contains all of the plurality of hazard data points;
   generating, while in flight, a third plurality of four-dimensional polyhedra within each of the four-dimensional polyhedral of the hazard occupancy region, each of the third plurality of four-dimensional polyhedral corresponding to a severity level region of a plurality of severity level regions within the hazard occupancy region, wherein each severity level region has a respective severity level;

receiving a safety threshold that contains a plurality of acceptable overlap quantities between the first union of the first plurality of the four-dimensional polyhedra of the aircraft occupancy region and a corresponding four-dimensional polyhedra of the third plurality of four-dimensional polyhedra within each four-dimensional polyhedra of the hazard occupancy region;

determining, while in flight, a plurality of overlap quantities, each overlap quantity corresponding to the first union of the first plurality of four-dimensional polyhedra of the aircraft occupancy region and the corresponding four-dimensional polyhedra of the third plurality of four-dimensional polyhedra within each four-dimensional polyhedra of the hazard occupancy region;

invalidating the main flight plan when one or more overlap quantities of the plurality of overlap quantities is greater than the corresponding acceptable overlap quantity of the safety threshold; and in response to invalidating the main flight plan, setting the main flight plan to the contingency flight plan.

2. The safety monitor as claimed in claim 1, wherein monitoring the main flight plan further comprises:
determining an uncertainty in a measured position of the aircraft due to a sensor accuracy; and
enlarging the aircraft occupancy region to reflect the uncertainty in the measured position of the aircraft.

3. The safety monitor as claimed in claim 1, wherein the first plurality of four-dimensional polyhedra are convex, and wherein the second plurality of four-dimensional polyhedra are convex.

4. The safety monitor as claimed in claim 1, wherein monitoring the main flight plan further comprises:
determining an uncertainty due to pilot decisions and/or flight data; and
enlarging the aircraft occupancy region to reflect the uncertainty due to the pilot decisions and/or flight data.

5. The safety monitor as claimed in claim 1, wherein monitoring the main flight plan further comprises:
determining an uncertainty in a predicted input corresponding to the one or more hazards; and
enlarging the hazard occupancy region to reflect the uncertainty in the predicted input corresponding to the one or more hazards.

6. The safety monitor as claimed in claim 1, wherein monitoring the main flight plan further comprises enlarging the hazard occupancy region by a safety separation distance or enlarging the aircraft occupancy region by the safety separation distance.

7. The safety monitor as claimed in claim 1, wherein each of the plurality of acceptable overlap quantities of the safety threshold is zero.

8. The safety monitor as claimed in claim 1, wherein monitoring the main flight plan further comprises:
determining an uncertainty in a second measured input corresponding to the one or more hazards due to a second sensor accuracy; and
enlarging the hazard occupancy region to reflect the uncertainty in the second measured input corresponding to the one or more hazards.

9. A method of operating a safety monitor for an aircraft with a pilot, the method comprising:
receiving from a flight planner a main flight plan comprising a plurality of main waypoints for the aircraft to follow from a planned origin to a planned destination on a flight mission, wherein each main waypoint has four dimensions corresponding to latitude, longitude, altitude, and time;

receiving from the flight planner a contingency flight plan comprising a plurality of contingent waypoints for the aircraft to follow from the planned origin to the planned destination on the flight mission, wherein each contingent waypoint has four dimensions corresponding to latitude, longitude, altitude, and time; and continually monitoring the main flight plan while in flight, wherein monitoring the main flight plan comprises:
generating, while in flight, an aircraft occupancy region comprising a first union of a first plurality of four-dimensional polyhedra, wherein the first union contains all of the plurality of selected waypoints of the selected flight plan;

receiving from a sensor, a weather forecast, or a different external source, hazard data corresponding to one or more hazards, wherein the hazard data includes a plurality of hazard data points, and each hazard data point has four dimensions corresponding to latitude, longitude, altitude, and time;

generating, while in flight, a hazard occupancy region comprising a second union of a second plurality of four-dimensional polyhedra, wherein the second union contains all of the plurality of hazard data points;

generating, while in flight, a third plurality of four-dimensional polyhedra within each of the four-dimensional polyhedra of the hazard occupancy region, each of the third plurality of four-dimensional polyhedra corresponding to a severity level region of a plurality of severity level regions within the hazard occupancy region, wherein each severity level region has a respective severity level;

receiving a safety threshold that contains a plurality of acceptable overlap quantities between the first union of the first plurality of the four-dimensional polyhedra of the aircraft occupancy region and a corresponding four-dimensional polyhedra of the third plurality of four-dimensional polyhedra within each four-dimensional polyhedra of the hazard occupancy region;

determining, while in flight, a plurality of overlap quantities, each overlap quantity corresponding to the first union of the first plurality of four-dimensional polyhedra of the aircraft occupancy region and the corresponding four-dimensional polyhedra of the third plurality of four-dimensional polyhedra within each four-dimensional polyhedra of the hazard occupancy region;

invalidating the main flight plan when one or more overlap quantities of the plurality of overlap quantities is greater than the corresponding acceptable overlap quantity of the safety threshold; and in response to invalidating the main flight plan, setting the main flight plan to the contingency flight plan.

10. The method as claimed in claim 9, wherein monitoring the main flight plan while in flight further comprises:
    determining an uncertainty in a measured position of the aircraft due to a sensor accuracy; and
    enlarging the aircraft occupancy region to reflect the uncertainty in the measured position of the aircraft.

11. The method as claimed in claim 9, wherein the first plurality of four-dimensional polyhedra are convex, and wherein the second plurality of four-dimensional polyhedra are convex.

12. The method as claimed in claim 9, wherein monitoring the main flight plan while in flight further comprises:
    determining an uncertainty due to pilot decisions and/or flight data; and
    enlarging the aircraft occupancy region to reflect the uncertainty due to the pilot decisions and/or flight data.

13. The method as claimed in claim 9, wherein monitoring the main flight plan while in flight further comprises:
    determining an uncertainty in a predicted input corresponding to the one or more hazards; and
    enlarging the hazard occupancy region to reflect the uncertainty in a predicted input corresponding to the one or more hazards.

14. The method as claimed in claim 9, wherein monitoring the main flight plan while in flight further comprises enlarging the hazard occupancy region by a safety separation distance or enlarging the aircraft occupancy region by the safety separation distance.

15. The method as claimed in claim 9, wherein each of the plurality of acceptable overlap quantities of the safety threshold is zero.

16. The method as claimed in claim 9, wherein monitoring the main flight plan while in flight further comprises:
    determining an uncertainty in a second measured input corresponding to the one or more hazards due to a second sensor accuracy; and
    enlarging the hazard occupancy region to reflect the uncertainty in the second measured input corresponding to the one or more hazards.

17. A safety monitor for an aircraft with a pilot, the safety monitor comprising:
    a flight planner configured to generate:
        a main flight plan comprising a plurality of main waypoints for the aircraft to follow from a planned origin to a planned destination on a flight mission, wherein each main waypoint has four dimensions corresponding to latitude, longitude, altitude, and time; and
        a contingency flight plan comprising a plurality of contingent waypoints for the aircraft to follow from the planned origin to the planned destination on the flight mission, wherein each contingent waypoint has four dimensions corresponding to latitude, longitude, altitude, and time;
    a first interface configured to autonomously receive a measured input including at least one of data relating to the aircraft from one or more aircraft sensors and data relating to hazards from one or more hazard sensors, the measured input being associated with a corresponding Uncertainty in Measured Inputs (UMI);
    a second interface configured to autonomously receive a predicted input including information relating to predicted hazards, the predicted input being associated with a corresponding Uncertainty in Predicted Inputs (UPI);
    a third interface configured to autonomously receive at least one of pilot data corresponding to an action of the pilot of the aircraft and flight data corresponding to a deviation from the selected flight plan, each of the pilot data and the flight data being jointly associated with a corresponding Uncertainty in Pilot Decisions and Approximations (UPDA); and
    a processor connected to the first, second, and third interface, and in communication with the flight planner, wherein the processor is configured to:
    receive from the flight planner the main flight plan;
    receive from the flight planner the contingency flight plan;
    and
    continually monitor the main flight plan while in flight, wherein monitoring the main flight plan comprises:
        generating, while in flight, an aircraft occupancy region comprising a first union of a first plurality of four-dimensional polyhedra, wherein the first union contains all of the plurality of selected waypoints of the selected flight plan;
        receiving from a sensor, a weather forecast, or a different external source, hazard data corresponding to one or more hazards, wherein the hazard data includes a plurality of hazard data points, and each hazard data point has four dimensions corresponding to latitude, longitude, altitude, and time;
        generating, while in flight, a hazard occupancy region comprising a second union of a second plurality of four-dimensional polyhedra, wherein the second union contains all of the plurality of hazard data points;
        generating, while in flight, a third plurality of four-dimensional polyhedra within each of the four-dimensional polyhedra of the hazard occupancy region, each of the third plurality of four-dimensional polyhedra corresponding to a severity level region of a plurality of severity level regions within the hazard occupancy region, wherein each severity level region has a respective severity level;
        enlarging the aircraft occupancy region to reflect the corresponding uncertainty in the measured inputs;
        enlarging the hazard occupancy region to reflect the corresponding uncertainty in predicted inputs;
        enlarging the aircraft occupancy region to reflect the uncertainty due to the corresponding uncertainty in the pilot decisions and/or flight data;
        receiving a safety threshold that contains a plurality of acceptable overlap quantities between the first union of the first plurality of the four-dimensional polyhedra of the aircraft occupancy region and a corresponding four-dimensional polyhedra of the third plurality of four-dimensional polyhedra within each four-dimensional polyhedra of the hazard occupancy region;
        determining, while in flight, a plurality of overlap quantities, each overlap quantity corresponding to the first union of the first plurality of four-dimensional polyhedra of the aircraft occupancy region and the corresponding four-dimensional polyhedra of the third plurality of four-dimensional polyhedra within each four-dimensional polyhedra of the hazard occupancy region;
        invalidating the main flight plan when one or more overlap quantities of the plurality of overlap quantities is greater than the corresponding acceptable overlap quantity of the safety threshold; and in response to invalidating the main flight plan, setting the main flight plan to the contingency flight plan.

\* \* \* \* \*